Figure 1:
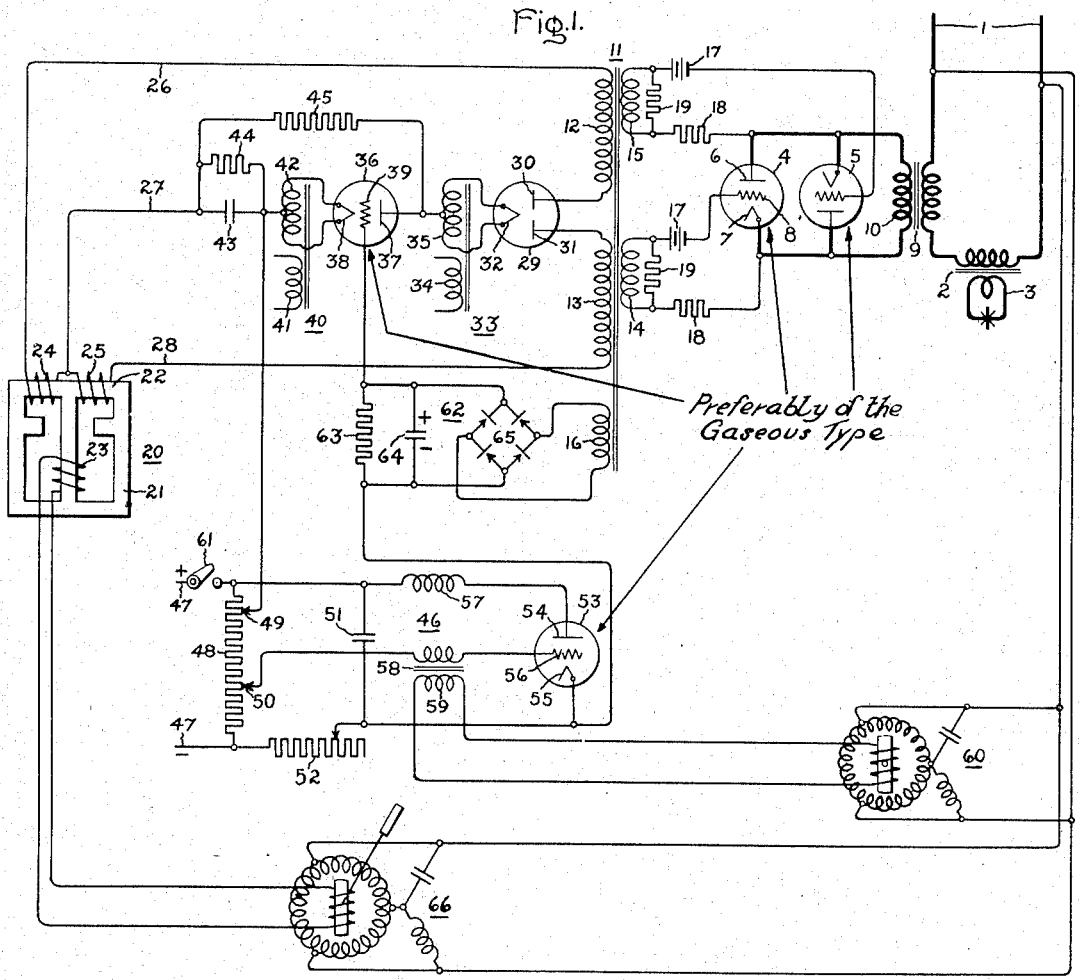

July 18, 1939.    H. W. LORD    2,166,309

ELECTRIC VALVE CIRCUIT

Original Filed April 24, 1937

Inventor:
Harold W. Lord,
by Harry E. Dunham
His Attorney.

Patented July 18, 1939

2,166,309

UNITED STATES PATENT OFFICE 2,166,309

ELECTRIC VALVE CIRCUIT

Harold W. Lord, Schenectady, N. Y., assignor to General Electric Company, a corporation of New York Application April 24, 1937, Serial No. 138,809
Renewed February 11, 1938

16 Claims. (Cl. 250—27)

My invention relates to electric valve circuits and more particularly to control or excitation circuits for electric valve translating apparatus.

Heretofore there have been devised numerous arrangements employing electric valve means for transmitting energy between alternating current circuits or between alternating current circuits and direct current circuits. In the control of electric valve means of the type employing an ionizable medium, such as a gas or a vapor, it has been found advantageous to control the electric valve means by shifting the phase of the voltages impressed on the control members, in this way to effect a control of the portion of each half cycle of the applied voltage during which the electric valve means conducts current. This type of control is particularly desirable in circuits, such as welding circuits, where it is important to effect energization of an associated load circuit during only a portion of a half cycle of applied voltage. Furthermore, it has been found to be particularly desirable to employ alternating voltages of peaked wave form to control the conductivity of the electric valve means. In the prior art arrangements where it has been attempted to combine these two features in a control circuit for electric valve means, the apparatus for providing this type of control has been complicated in construction and arrangement and has necessitated the use of control apparatus inordinate in size and rating as compared to the rating of the main or power apparatus to be controlled.

It is an object of my invention to provide a new and improved electric valve circuit.

It is another object of my invention to provide a new and improved control or excitation circuit for electric valve means.

It is a further object of my invention to provide a new and improved electric valve translating circuit for transmitting energy between alternating current circuits or between alternating current circuits and direct current circuits.

It is a still further object of my invention to provide an improved control circuit for electric valve means of the type employing an ionizable medium which is simple in construction and arrangement.

In accordance with the illustrated embodiment of my invention, I provide a new and improved control circuit for electric valve means. The conductivity of the electric valve means is controlled by impressing on the control members thereof alternating voltages of peaked wave form adjustable in phase to control the amount of energy transferred to an associated load circuit. The control circuit for the valve means includes a source of alternating voltage of peaked wave form and a pair of circuits arranged to conduct current alternately and which impress alternating voltages of peaked wave form on the control members of the electric valves. Each of the circuits includes a unidirectional conducting path, such as an electric valve or a contact rectifying device. A single electronic discharge device of the type employing an ionizable medium is connected in series relation with the unidirectional conducting paths to control the current transmitted thereby and hence to effect control of the alternating voltages of peaked wave form impressed on the control members of the electric valve means. A control circuit is employed to impress on a control member of the electronic discharge device a periodic electrical quantity, such as a periodic alternating voltage, to render the discharge device conductive for a predetermined number of half cycles of voltage of the supply circuit. As a further feature of my invention, I provide means for introducing in the control circuit for the electronic discharge device a voltage to assure that the discharge device is rendered conductive at the beginning of each of the number of half cycles of conduction established by the control or timing circuit, in this way providing an arrangement for locking in the excitation circuit to assure positive and precise control even though the rate of change of the periodic control voltage is relatively small.

Figure 2:
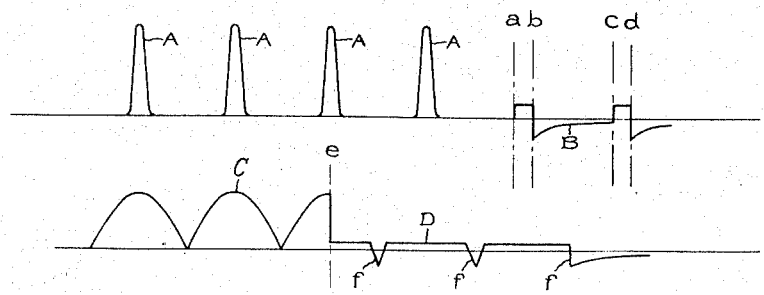

For a better understanding of my invention, reference may be had to the following description taken in connection with the accompanying drawing, and its scope will be pointed out in the appended claims. Fig. 1 of the accompanying drawing diagrammatically represents an embodiment of my invention as applied to an electric valve system for energizing a welding circuit, and Fig. 2 represents certain operating characteristics thereof.

In Fig. 1 of the accompanying drawing my invention is diagrammatically shown as applied to an electric valve translating circuit for transmitting energy from an alternating current circuit 1 to a load device, such as a transformer 2. The transformer 2, for the purpose of illustration, is shown as being arranged to supply a welding or load circuit 3. In order to control the transfer of energy from the alternating current circuit 1 to the load circuit 3, I may employ a pair of oppositely disposed electric valves 4 and 5 which are arranged to conduct current alternately. The electric valves 4 and 5 are preferably of the type employing an ionizable medium, such as a gas or a vapor, and each includes an anode 6, a cathode 7 and a control member 8. The electric valves 4 and 5 may be connected across a secondary winding 10 of an inductive device 9 to control the impedance of the inductive device 9 and hence to control the energy transferred from the supply circuit 1 to the load circuit 3. It is to be understood that the electric valve means 4 and 5 may be connected directly in circuit with the primary winding of transformer 2 and that the inductive device 9 need not be employed if it is so desired. Furthermore, it is to be understood that where it is desirable to effect energization of the load circuit 3 from the alternating current circuit 1 during only half cycles of a predetermined polarity, I may employ only one electric valve means.

I provide a control or excitation circuit for impressing on control members 8 of electric valve means 4 and 5 a voltage of peaked wave form and this control circuit comprises an inductive device, such as a transformer, 11 having a pair of primary windings 12 and 13, a pair of secondary windings 14 and 15 and a tertiary winding 16. The secondary windings 14 and 15 are connected to control members 8 of electric valves 4 and 5, respectively. A negative unidirectional biasing voltage may be impressed on control members 8 of electric valves 4 and 5 by any suitable means such as batteries 17, and suitable current limiting resistances 18 may be connected in series relation with the associated secondary windings and the control members. In order to impose a predominately resistive load across the secondary windings 14 and 15 of transformer 11, I connect resistances 19 across these windings.

In order to supply to the primary windings 12 and 13 of transformer 11 suitable currents to induce in the secondary windings 14 and 15 alternating voltages of peaked wave form, I employ a source of alternating voltage of substantially peaked wave form which may be furnished by a saturable inductive device 20 having a core member 21, a saturable section 22, a primary exciting winding 23 and secondary windings 24 and 25 in which there is induced an alternating voltage of peaked wave form. While I have chosen to represent this source of alternating voltage of peaked wave form as comprising a saturable inductive device, it is to be understood that if desirable I may employ any other conventional arrangement. Interposed between the inductive device 20 and the transformer 11 there is provided a pair of circuits including conductors 26, 27 and 28, conductor 26 being connected to the upper terminal of primary winding 12 and conductor 28 being connected to the lower terminal of primary winding 13. Each of the circuits includes a unidirectional conducting path. These unidirectional conducting paths may be afforded by electronic discharge devices or by the use of suitable contact rectifying means. In the particular arrangement shown in the drawing, I have chosen to represent these unidirectional conducting paths as comprising an electronic discharge device 29 having anodes 30 and 31 and a cathode 32. A suitable cathode heating transformer 33 having a primary winding 34 and a secondary winding 35 may be employed to energize the cathode 32 of the discharge device 29.

Connected in series relation with the unidirectional conducting paths to control the current transmitted thereby, I provide an electronic discharge device 36, preferably of the type employing an ionizable medium such as a gas or a vapor, and including an anode 37, a cathode 38 and a control member 39. A suitable cathode heating transformer 40 having a primary winding 41 and a secondary winding 42 may be associated with the electronic discharge device 36 for heating the cathode thereof.

As an agency for rendering the electronic discharge device 36 nonconductive at the end of each half cycle of voltage of peaked wave form or at the end of each impulse of current conducted thereby, I employ a capacitance 43 connected in series relation with the electronic discharge device 36. A resistance 44 is connected across the capacitance 43 and serves as a discharge circuit for the capacitance, and a suitable impedance element, such as a resistance 45, is connected across the serially-connected capacitance 43 and the electronic discharge device 36 for impressing on the anode 37 thereof a negative transient potential to render the discharge device nonconductive at the end of each half cycle of conduction. This arrangement for controlling an electric valve means of the type employing an ionizable medium for a full wave rectifying circuit is disclosed and broadly claimed in Letters Patent No. 2,098,051 granted November 2, 1937, on my application Serial No. 69,243, filed March 16, 1936, and assigned to the assignee of the present application. This application is made to protect the further invention which the applicant believes to be present in the apparatus set forth in the claims hereof over and beyond the claims set forth in the aforementioned Letters Patent.

To impress on control member 39 of electronic discharge device 36 a periodic timing quantity, such as a periodic voltage, to render the electronic discharge device 36 conductive for a predetermined interval of time and hence to effect energization of the load circuit from the alternating current circuit 1 for a corresponding interval of time, I employ a control or timing circuit 46. The timing circuit 46 includes a source of unidirectional voltage 47, a voltage divider including a resistance 48 having adjustable contacts 49 and 50, a capacitance 51 which is charged from the source 47 through an adjustable resistance 52, and an electric valve 53 for periodically discharging the capacitance 51. The electric valve 53 is preferably of the type employing an ionizable medium, such as a gas or a vapor, and includes an anode 54, a cathode 55, and a control member 56. An inductance 57 is connected in series relation with the electric valve 53 to impress thereon a negative transient voltage to render the electric valve 53 periodically nonconductive to permit the control member 56 to regain control at the end of each discharge of the capacitance 51. Interposed between the adjustable contact 50 of the voltage divider and the control member 56 of electric valve 53 there is introduced, by the agency of a transformer 58, an alternating voltage properly correlated in phase and frequency relative to the voltage of the alternating current circuit 1 so that the electric valve means 4 and 5 are controlled at the proper time relative to the voltage of supply circuit 1. Transformer 58 may be of the type designed to furnish an alternating voltage of peaked wave form to render the electric valve 53 conductive at a predetermined instant during the voltage of the alternating current circuit 1, in this way to effect accurate control of the times at which the electric valves 4 and 5 are rendered conductive. Primary winding 59 of transformer 58 may be energized from any suitable source of alternating current correlated in phase and frequency with respect to the voltage of the alternating current circuit 1. In the particular arrangement shown in Fig. 1, the transformer 58 is shown as connected to the alternating current circuit 1 through any conventional phase shifting arrangement such as a rotary phase shifting device 59. A circuit controlling means, such as a switch 61, may be interposed between the source of direct current 47 and the control circuit 46 to deenergize control circuit 46 to prevent energization of the load circuit 3.

To introduce in the control or excitation circuit 46 for the electronic discharge device 36 a positive voltage to render the electronic discharge device 36 conductive at the beginning of each half cycle of voltage of peaked wave form provided by the device 20, I provide a circuit 62. The circuit 62 may include an impedance element 63 connected in series relation with control member 39 of discharge device 36. A suitable energy storage device, such as a capacitance 64, is connected in parallel relation with the impedance element 63; and a rectifier 65 is energized from the tertiary winding 16 of transformer 11. The rectifier 65 is shown as being of the full wave rectifying type, but it is to be understood that other types of rectifiers may be employed. Since the tertiary winding 16 of transformer 11 is inductively associated with the primary and secondary windings, it is to be noted that the voltage appearing across impedance element 63 will vary in accordance with the transfer of energy from the inductive device 20 to the control circuits for electric valves 4 and 5. The circuit 62 is adjusted so that the magnitude of the voltage appearing across impedance element 63 is relatively small as compared to the periodic timing voltage provided by the control circuit 46 and serves to lock in the electronic discharge device 36 so that it is rendered nonconductive at substantially the same point or time in each half cycle of voltage of peaked wave form during the interval established by the control circuit 46.

As an agency for controlling the phase of the alternating voltage of peaked wave form provided by the saturable inductive device 20 I employ any conventional phase shifting arrangement such as the rotary phase shifter 66 which may be manually or automatically operated. The phase shifter 66 is shown as being energized from the alternating current supply circuit 1 and it is to be understood that any other suitable source of alternating voltage of the proper frequency may be employed if desired.

The general principles of operation of the embodiment of my invention diagrammatically shown in Fig. 1 will be explained by considering the system when energy is being transmitted from the alternating current circuit 1 to the load circuit 3 through the inductive device 9 and the transformer 2. It will be well understood by those skilled in the art that the voltage impressed on the load circuit by the electric valve means 4 and 5 will be increased as the time of ignition of the valves 4 and 5 is advanced toward the beginning of each positive half cycle of voltage impressed on the associated anodes, and that the voltage so impressed by the electric valves will be decreased as the electric valves are rendered conductive at later times during the respective half cycles of the voltage applied to the anodes. For example, when the load is resistive and when the voltages of peaked wave form impressed on the control members 8 of electric valves 4 and 5 occur at the beginning of the positive half cycles of voltage, the current transmitted by the electric valves 4 and 5 will be maximum and the impedance offered by the inductive device 9 will be minimum to effect a maximum power transfer from the alternating current circuit 1 to the load circuit 3. It will be understood that as the voltages of peaked wave form impressed on control members 8 are retarded, the current transmitted by electric valves 4 and 5 will be decreased to effect an increase in the impedance offered by the inductive device 9 to decrease the power transfer from the supply circuit 1 to the load circuit 3.

Let it be assumed that the switch 61 is closed and that the control or timing circuit 46 is adjusted so that the periodic voltage impressed on control member 39 of electronic discharge device 36 is sufficiently positive relative to the cathode 38 to render discharge device 36 conductive for a predetermined number of half cycles of alternating voltage supplied by the saturable inductive device 20 or for a predetermined number of half cycles of the voltage of supply circuit 1. The electric valve 53 will be rendered conductive at a predetermined instant during a cycle of voltage of circuit 1 to render electric valves 4 and 5 conductive at the proper instants during the respective half cycles of voltage applied thereto. Since the two circuits including conductors 26, 27 and 28 are arranged through the discharge device 29 to conduct current alternately, the voltage appearing between anode 37 and cathode 38 of electronic discharge device 36 will correspond to that represented by curves A of Fig. 2. The rectification of the alternating voltage of peaked wave form provided by saturable inductive device 20 is effected by the electronic discharge device 29. If it be assumed that the periodic control voltage provided by control circuit 46 becomes sufficiently positive at a time corresponding to the position of line $a$, electronic discharge device 36 will be rendered conductive at this time and will conduct current during the interval $a$—$b$. Curve B represents the voltage appearing across anode 37 and cathode 38 of discharge device 36 during the interval of conduction established by control circuit 46. At time $b$ the electronic discharge device 36 will be rendered nonconductive by virtue of the negative transient voltage impressed on anode 37 thereof by means of the capacitance 43 and the resistance 45. During the interval $b$—$c$ this transient voltage will decay exponentially by virtue of the discharge of capacitance 43 through the shunt connected resistance 44. At time $c$ the electronic discharge device 36 is again rendered conductive and transmits current during the interval $c$—$d$, and this cycle of operation is repeated so long as the periodic control voltage provided by circuit 46 remains sufficiently positive relative to the cathode 38. It is to be noted that the period of the periodic control voltages provided by control circuit 46 is determined principally by the time constant of the circuit including capacitance 51, resistance 52 and the setting of adjustable contact 50 of circuit 46.

Curve C of Fig. 2 represents the voltage which would appear across anode 37 and cathode 38 of electronic discharge device 36 if an alternating voltage of sinusoidal wave form were employed instead of an alternating voltage of peaked wave form, and curve D represents the voltage which would appear across anode 37 and cathode 38 of this discharge device during the interval of conduction established by the timing circuit 46 if discharge device 36 were rendered conductive at time e. The negative peaks represented by portions f of curve D are due to capacitance 43 and resistance 45.

Circuit 62, which is energized from the tertiary winding 16 of transformer 11 which in turn is energized in accordance with the transfer of energy to the control circuits for electric valves 4 and 5, impresses a positive voltage on control member 39 of electronic discharge device 36 to lock in the discharge device 36 to assure that it is rendered conductive at the proper time during each half cycle of voltage impressed thereon, even though the rate of change of the periodic control voltage is relatively small. In this manner there is provided an arrangement for assuring a positive and precise control of the electronic discharge device 36.

By the proper adjustment of the control circuit 46, the period during which energy is supplied to the load circuit 3 from the supply circuit 1 may be accurately controlled and this control is effected by controlling the number of impulses of voltage of peaked wave form which are impressed on control members 8 of electric valves 4 and 5. So long as the switch 61 is maintained in the closed circuit position, control circuit 46 will function to supply a periodic control voltage to render electronic discharge device 36 conductive for a predetermined time and hence to render electric valves 4 and 5 conductive during a corresponding interval of time. The ratio of time-on to time-off of electronic discharge device 36 may be controlled by adjusting contact 49, in this way providing an arrangement for controlling the ratio of time-on to time-off of electric valves 4 and 5. The time of the welding cycle, that is, the sum of the time-on and the time-off intervals may be controlled by adjusting resistance 52. Furthermore, by adjustment of the rotary phase shifter 66, the portion of each half cycle of voltage of circuit 1 during which electric valves 4 and 5 conduct current may be controlled to control the amount of energy transmitted to the load circuit 3. For example, if it is desired to effect energization of a welding circuit during a predetermined number of half cycles, this control may be effected by the adjustment of control circuit 46 to render electric valves 4 and 5 conductive during a corresponding interval of time. Moreover, by the adjustment of rotary phase shifter 66, the amount of energy transmitted during that interval may be controlled by this selective phase adjustment of the voltages impressed on control members 8.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, an alternating current load circuit, electric valve means interposed therebetween for controlling the transfer of energy from said supply circuit to said load circuit and being provided with a control member for controlling the conductivity thereof, and a control circuit for energizing said control member comprising a source of alternating voltage of peaked wave form, an inductive device having a pair of primary windings and a secondary winding connected to said control member, a pair of circuits energized from said source of voltage of peaked wave form each associated with a different one of said primary windings and each including a unidirectional conducting path and arranged to transmit current alternately, an electronic discharge device of the type employing an ionizable medium and having a control member and being connected in series relation with said unidirectional conducting paths for controlling the transfer of current therethrough and means connected across said electronic discharge device to render said device nonconductive at the end of each half cycle of conduction to permit said control member to obtain control.

2. In combination, an alternating current supply circuit, an alternating current load circuit, electric valve means for controlling the transfer of energy between said circuits and including a control member for controlling the conductivity thereof, a transformer having a pair of primary windings and a secondary winding connected to said control member, an inductive device energized from said alternating current circuit for providing an alternating voltage of peaked wave form, a pair of circuits connected between said inductive device and said primary windings of said transformer and each including a unidirectional conducting path and arranged for transmitting current alternately, an electronic discharge device of the type employing an ionizable medium and having a control member and being connected in series relation with said conducting paths for rendering said electronic discharge device nonconductive at the end of each half cycle of conduction, a control circuit for energizing said control member of said electronic discharge device, and means energized in accordance with the current conducted by said primary windings for introducing in said control circuit a voltage to maintain said electronic discharge device conductive during the interval of conduction established by said control circuit.

3. In combination, an alternating current supply circuit, a second alternating current circuit, electric translating apparatus interposed therebetween comprising an inductive device and an electronic discharge device of the type employing an ionizable medium and having a control member for controlling the transfer of energy between said supply circuit and said second circuit, means for rendering said discharge device nonconductive at the end of each half cycle of voltage of said supply circuit, a control circuit for impressing on said control member a periodic voltage to render said discharge device conductive for a predetermined number of half cycles of said supply circuit, and means responsive to the transfer of energy through said inductive device for introducing in said control circuit a positive voltage to render said discharge device conductive at the beginning of each of said number of half cycles of conduction established by said control circuit.

4. In a control circuit for an electric valve means having a control member, the combination of a source of alternating voltage of peaked wave form, a transformer having a pair of primary windings and a secondary winding connected to said control member, a pair of circuits interposed between said source and said primary windings and each including a unidirectional conducting path and arranged for transmitting current alternately, an electronic discharge device of the type employing an ionizable medium having a control member and being connected in series relation with said unidirectional conducting paths, means connected across said discharge device for rendering said device nonconductive at the end of each impulse of current conducted thereby and means for energizing said control member of said discharge device to render said device conductive for a predetermined interval of time.

5. In an excitation circuit for an electric valve means having a control member, the combination of a source of alternating voltage of peaked wave form, a transformer having a pair of primary windings and a secondary winding connected to said control member, a pair of circuits interposed between said source and said primary windings and each including a unidirectional conducting path and arranged for transmitting current alternately, an electronic discharge device of the type employing an ionizable medium and having a control member and being connected in series relation with said unidirectional paths for controlling the current conducted thereby, means comprising a capacitance connected in series relation with said discharge device and an impedance element connected across said discharge device and said capacitance for rendering said device nonconductive at the end of each half cycle of conduction, and a control circuit for impressing on said control member of said discharge device a periodic timing quantity to render said discharge device conductive for a predetermined number of half cycles of voltage of said source.

6. In a control circuit for an electric valve means having a control member, the combination of a source of alternating voltage of peaked wave form, a transformer having a pair of primary windings and a secondary winding connected to said control member, a pair of circuits interposed between said source and said primary windings for transmitting current alternately and each including a unidirectional conducting path, an electronic discharge device of the type employing an ionizable medium and having a control member and being connected in series relation with said unidirectional conducting paths to control the number of impulses of voltage impressed on said control member of said electric valve means, means connected across said discharge device for rendering said device nonconductive at the end of each half cycle of conduction, a circuit for providing a periodic timing quantity for rendering said discharge device conductive for a predetermined number of half cycles of voltage of said source, and means responsive to the transfer of current through said primary windings for impressing on said control member of said discharge device a positive voltage to render said discharge device conductive at the beginning of each of said number of half cycles of conduction established by said control circuit.

7. In combination, an alternating current supply circuit, an alternating current load circuit, electric translating apparatus interposed between said circuits including a pair of circuits, an inductive device having a pair of primary windings each associated with a different one of said circuits, a secondary winding connected to said load circuit and a tertiary winding, a pair of unidirectional conducting paths each connected in series relation with a different one of said primary windings and a different one of said pair of circuits and an electric valve means connected in series relation with said unidirectional conducting paths for controlling the energy transmitted by said circuits, said electric valve means being of the type employing an ionizable medium and having a control member for controlling the conductivity thereof, means connected across said electric valve means for impressing thereon a transient voltage for rendering said electric valve means nonconductive at the end of each half cycle of conduction, a control circuit for energizing said control member to render said electric valve means conductive during a predetermined number of half cycles of voltage of said supply circuit, and means energized in accordance with the voltage of said tertiary winding for introducing in said control circuit a voltage to render said electric valve means conductive at the beginning of each half cycle of voltage during the interval of conduction established by said control circuit.

8. In combination, an alternating current supply circuit, a second circuit to be energized from said alternating current circuit, electric translating apparatus interposed between said circuits including an inductive device having a pair of primary windings and a secondary winding connected to said second circuit, a pair of circuits connected between said supply circuit and said primary windings and each including a unidirectional conducting path, said pair of circuits being arranged to conduct current alternately through the associated unidirectional conducting path, an electronic discharge device, of the type employing an ionizable medium and having a control member, connected in series relation with said unidirectional conducting paths for controlling the current transmitted thereby, means connected across said discharge device for rendering said discharge device nonconductive at the end of each half cycle of conduction, a control circuit for energizing said control member to render said discharge device conductive for a predetermined number of half cycles of voltage of said supply circuit and means for introducing in said control circuit a voltage to render said discharge device conductive at the beginning of each of said number of half cycles of conduction established by said control circuit.

9. In combination, an alternating current supply circuit, a load device, a pair of oppositely disposed electric valve means interposed between said supply circuit and said load device for controlling the transfer of energy therebetween, said electric valve means each being provided with a control member for controlling the conductivity thereof, a source of alternating voltage of peaked wave form, a transformer having a pair of primary windings, a pair of secondary windings each connected to the control member of a different one of said electric valve means and a tertiary winding, a pair of circuits for connecting said primary windings to said source and each including a unidirectional conducting path, said pair of circuits being arranged to transmit current alternately to induce in said secondary windings a voltage of peaked wave form, an electronic discharge device of the type employing an ionizable medium and having a control member for controlling the conductivity thereof, means connected across said discharge device for rendering said device nonconductive at the end of each half cycle of conduction, a control circuit for impressing a periodic timing voltage on said control member of said discharge device to render said device conductive for a predetermined number of half cycles of voltage of said source and to render said electric valve means conductive for a corresponding interval of time, and means for introducing in said control circuit a voltage to render said discharge device conductive at the beginning of each of said number of half cycles of conduction established by said control circuit comprising a resistance connected in series relation with said control member of said discharge device, a capacitance connected in parallel relation therewith and a rectifier energized by said tertiary winding for charging said capacitance.

10. In combination, an alternating current supply circuit, a load circuit, electric valve means interposed between said circuits including a control member for controlling the transfer of energy between said circuits, and means for energizing said control member to render said electric valve means conductive for a predetermined number of half cycles of voltage of said supply circuit and to maintain said valve means nonconductive for a predetermined interval of time thereafter comprising a source of alternating voltage of peaked wave form, an inductive device having a pair of primary windings and a secondary winding connected to said control member for impressing thereon an alternating voltage of peaked wave form, a pair of circuits interposed between said source and said primary windings for conducting current alternately and each including a unidirectional conducting path, an electronic discharge device, of the type employing an ionizable medium and having a control member, for controlling the current transmitted by said pair of circuits, a circuit for rendering said discharge device nonconductive at the end of each half cycle of voltage of said source and a control circuit for impressing a periodic voltage on said control member of said discharge device.

11. In combination, an alternating current supply circuit, a load circuit, electric valve means interposed between said circuits including a control member for controlling the transfer of energy between said circuits, a source of alternating voltage of peaked wave form, an inductive device having a pair of primary windings and a secondary winding connected to said control member for impressing thereon a control voltage, a pair of circuits interposed between said source and said primary windings for conducting current alternately and each including a unidirectional conducting path, an electronic discharge device of the type employing an ionizable medium and having a control member, for controlling the current transmitted by said pair of circuits, means for rendering said discharge device nonconductive at the end of each half cycle of voltage of said source, a control circuit for rendering said discharge device conductive for a predetermined number of half cycles of voltage of said supply circuit, and means for controlling the phase of said alternating voltage of peaked wave form to control the time, during each half cycle of voltage of said supply circuit, at which said electric valve means is rendered conductive.

12. In combination, an alternating current supply circuit, an alternating current load circuit, a pair of oppositely disposed electric valve means interposed therebetween for controlling the transfer of energy from said supply circuit to said load circuit and each including a control member for controlling the conductivity thereof, a transformer having a pair of primary windings and a pair of secondary windings each connected to the control member of a different one of said electric valve means for impressing thereon control voltages, means for supplying an alternating voltage of peaked wave form comprising a saturable inductive device energized from said supply circuit, a pair of circuits connected between said inductive device and said primary windings and each including a unidirectional conducting path, said circuits being arranged to conduct current alternately, an electronic discharge device connected in series relation with said unidirectional conducting paths and including a control member for controlling the conductivity thereof, means for rendering said electronic discharge device nonconductive at the end of each half cycle of voltage of peaked wave form, a control circuit for rendering said discharge device conductive for a predetermined number of half cycles of voltage of said supply circuit, and means for shifting the phase of said alternating voltage of peaked wave form to control the phase of said control voltages to control the time during each half cycle of voltage of said supply circuit at which said electric valve means are rendered conductive.

13. In combination, an alternating current supply circuit, a load circuit, electric valve means connected between said circuits for transmitting power therebetween and including a control member for controlling the conductivity thereof, an excitation circuit for energizing said control member comprising means for producing a periodic voltage of peaked wave form, means connected between said control member and said last mentioned means and comprising a serially connected unidirectional conducting device having an anode-cathode circuit and an electronic discharge valve having an anode, a cathode and a control member, the anode-cathode circuits of said unidirectional conducting device and said electronic discharge valve being connected in series relation with each other and connected to be energized from said means which produces a periodic voltage of peaked wave form, means for energizing said second mentioned control member to effect energization of said load circuit during a predetermined interval, and means for controlling the phase of said periodic voltage to control the amount of energy transmitted to said load circuit during said interval.

14. In combination, an alternating current supply circuit, a load circuit, and apparatus for producing a train of electrical impulses having a predetermined phase relation with respect to the voltage of said supply circuit and comprising means for producing a periodic voltage of peaked wave form, means connected to said last mentioned means and comprising a serially-connected unidirectional conducting device having an anode-cathode circuit and an electronic discharge valve having an anode, a cathode and a control member, the anode-cathode circuits of said unidirectional conducting device and said electronic discharge valve being connected in series relation with each other and connected to be energized from said means which produces a periodic voltage of peaked wave form, means for energizing said control member to effect energization of said load circuit during a predetermined interval of time and means for controlling the phase of said periodic voltage.

15. In combination, an alternating current supply circuit, a load circuit, electric valve means connected between said circuits for transmitting power therebetween and including a control member for controlling the conductivity thereof, an excitation circuit for energizing said control member comprising a saturable inductive device energized from said alternating current circuit for producing a voltage of peaked wave form, means connected between said inductive device and said control member and comprising a serially-connected unidirectional conducting device having an anode-cathode circuit and an electronic discharge valve having an anode, a cathode and a control member, the anode-cathode circuits of said unidirectional conducting device and said electronic discharge valve being connected in series relation with each other and connected to be energized from said means which produces a periodic voltage of peaked wave form, means for energizing said second mentioned control member to effect energization of said load circuit during a predetermined interval, and phase shifting means interposed between said saturable inductive device and said supply circuit for controlling the phase of said periodic voltage to control the amount of energy transmitted to said load circuit during said interval.

16. In combination, an alternating current supply circuit, a second alternating current circuit, electric translating apparatus interposed therebetween and comprising an inductive device and an electronic discharge device having a control member for controlling the transfer of energy between said supply circuit and said second circuit, a control circuit for impressing on said control member a periodic voltage to render said discharge device conductive for a predetermined number of half cycles of the voltage of said supply circuit, and means responsive to the transfer of energy through said inductive device for introducing in said control circuit a positive voltage to render said discharge device conductive at the beginning of each of said number of half cycles of conduction established by said control circuit.

HAROLD W. LORD.